United States Patent
Arrane

(12) 
(10) Patent No.: US 6,581,869 B2
(45) Date of Patent: Jun. 24, 2003

(54) APPARATUS AND METHOD FOR FACILITATING SCROLLING OF A SCROLLABLE DOCUMENT

(75) Inventor: Yehuda Arrane, Moshav Gimzo (IL)

(73) Assignee: Shesh Moshzar, Ltd., Moshav Gimzu (IL)

( * ) Notice: Subject to any disclaimer, the term of this patent is extended or adjusted under 35 U.S.C. 154(b) by 78 days.

(21) Appl. No.: 09/760,605

(22) Filed: Jan. 17, 2001

(65) Prior Publication Data
US 2001/0025898 A1 Oct. 4, 2001

(30) Foreign Application Priority Data
Mar. 25, 2000 (IL) .................................................. 135191

(51) Int. Cl.⁷ ............................................. B65H 18/08
(52) U.S. Cl. .................................. 242/538.2; 242/533.8
(58) Field of Search ........................... 242/538.2, 538.3, 242/541.1, 533.8, 557, 599.3; 40/471, 518

(56) References Cited

U.S. PATENT DOCUMENTS

| | | | |
|---|---|---|---|
| 1,302,421 A | * | 4/1919 | Okihara .................... 242/538.2 |
| 1,954,227 A | * | 4/1934 | Rust ........................ 242/538.2 |
| 2,569,337 A | * | 9/1951 | Rice ........................ 242/538.2 |
| 3,363,854 A | * | 1/1968 | Becker, Jr. ................ 242/538.2 |
| 3,687,391 A | * | 8/1972 | Bournez .................... 242/538.2 |
| 3,785,729 A | * | 1/1974 | Dasher et al. ............. 242/538.2 |
| 3,798,807 A | * | 3/1974 | Stewart .................... 242/538.2 |
| 3,825,202 A | * | 7/1974 | Robinson .................. 242/538.2 |
| 4,157,626 A | | 6/1979 | Bedinghaus |
| 4,942,754 A | | 7/1990 | Patzelt |
| 5,517,778 A | * | 5/1996 | Simson ..................... 242/538.2 |
| 5,924,869 A | * | 7/1999 | Haas ........................... 40/518 |

FOREIGN PATENT DOCUMENTS

DE            617632       *   8/1935   ............. 242/538.2

* cited by examiner

Primary Examiner—William A. Rivera
(74) Attorney, Agent, or Firm—Browdy and Neimark, P.L.L.C.

(57) ABSTRACT

Apparatus for facilitating scrolling of a scrollable document on and off at least one roller fixed to a respective edge of the document, comprising a pair of tracks each for supporting a respective end of each roller, and for each roller, a corresponding pair of sliders at least one pair of which is adapted for sliding movement along a respective one of the tracks and each being adapted for rotatably supporting a corresponding end of the roller.

26 Claims, 4 Drawing Sheets

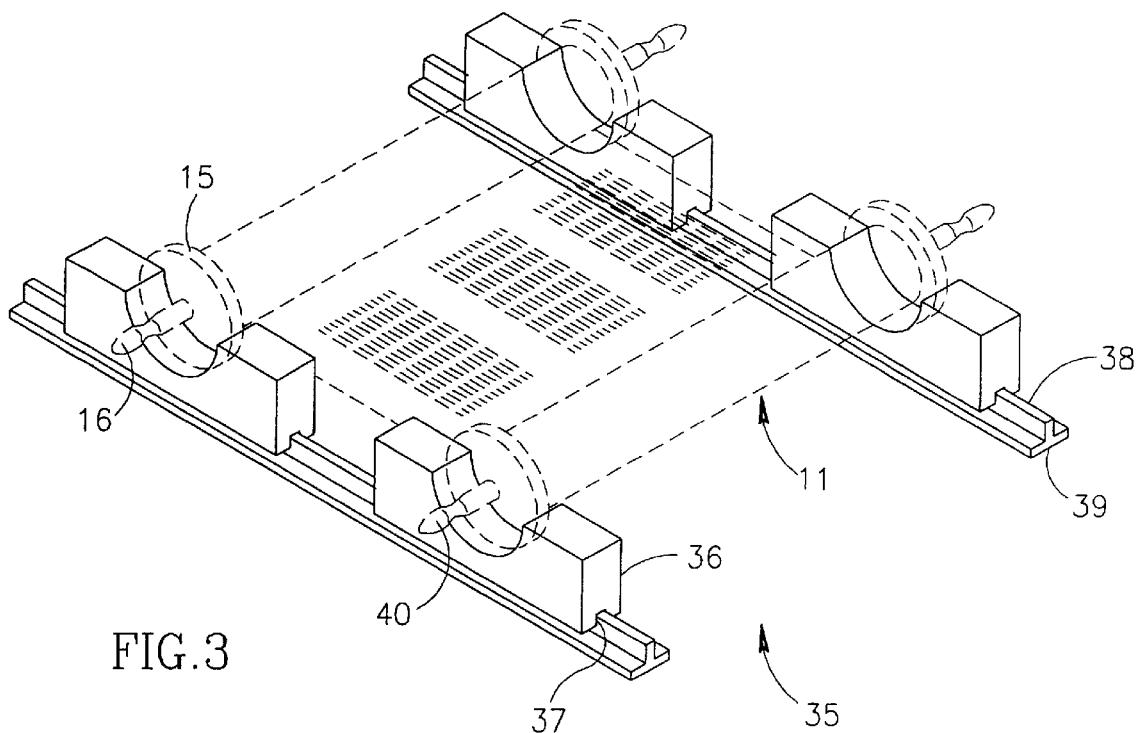
FIG.3
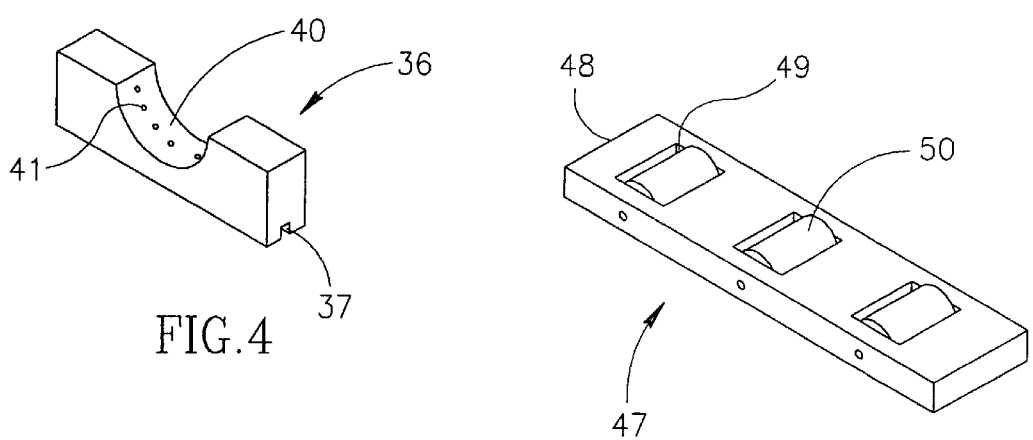
FIG.4
FIG.5
FIG.6

APPARATUS AND METHOD FOR FACILITATING SCROLLING OF A SCROLLABLE DOCUMENT

FIELD OF THE INVENTION

This invention relates to unrolling document scrolls.

BACKGROUND OF THE INVENTION

Prior to the advent of paper, documents were hand written on parchment and long documents were made into the form of a scroll. To this day, sacred Hebrew texts are still hand written on parchment scrolls and, during public readings in synagogue, it is from such scrolls that the texts are read. Such document scrolls are of two kinds: those containing short books of the bible such as the book of Esther or the book of Ruth and those which contain the whole of the five books of Moses, known as "Torah". In the case of short books of the bible, the parchment scroll is bound at its right hand edge to a roller typically having at its upper and lower ends circular discs or end-plates for confining therebetween the rolled up scroll. Protruding from these end-plates as an extension of the roller are handles, not infrequently decorated, which serve the purpose of rolling the parchment on to the roller or of unrolling it, as required.

In the case of the Torah scroll, the complete parchment scroll is bound at opposite left and right edges to respective rollers which, again, are provided with upper and lower end-plates and handles. In this case, the lower handles serve to lift the Torah scroll and, during use when a portion read in synagogue, to roll the parchment from one roller to the other, whereby the scroll can be rolled forwards and backwards, as required.

During such use, the four end-plates of the two rollers rest tangentially on the reading desk which is normally covered with a decorative cloth, not infrequently made from velvet. Parchment is, of course, much heavier than paper and a complete Torah scroll can weigh upwards of 15 or 20 Kg. The weight that thus acts on the discs can leave unsightly track marks in the cloth covering the reading desk, particularly when it is made of velvet or other easily impressionable material.

Furthermore, when it is desired, during reading, to advance the scroll from one column of text to another, this is done by the reader rotating the lower handles in the required direction and this operation, too, can be strenuous particularly for the very young or the very old. It should be borne in mind that Jewish boys aged 13 may, and frequently do, read from the Torah scroll in synagogue and the weight of the Torah scroll acting on the rollers often requires not insignificant effort to roll the scroll. Indeed, when it is required to roll the scroll either forwards or backwards through many chapters of holy writ, the rolling is often done by two adults acting in conjunction who hold the upper and lower handles on opposite sides of the scroll, respectively. Even then, not insignificant effort is required and the process of rolling a Torah scroll through many columns of text can be strenuous.

Notwithstanding the fact that Torah scrolls are thousands of years old, the above-described techniques for rolling the scroll forwards and backwards have remained largely constant, there being minor cultural distinctions between Torah scrolls used by oriental and German Jews, respectively, although the principles are the same in both cases.

It would clearly be desirable to provide an apparatus and method which would allow document scrolls of the kind described to be more easily scrolled, without requiring significant effort on the part of the reader and allowing the weight of the scroll to be more evenly distributed on the reading surface so as not to create unsightly impressions in the surface of the cloth covering the reading desk.

U.S. Pat. No. 4,942,754 discloses an arrangement for axially displacing rolls in rolling mill stands. The rolls of the rolling mill stands are supported in roll supports or chocks which are adjustably and slidably guided in the roll housings of the stand. The rolls are displaceable by means of hydraulic piston-cylinder units which are supported relative to the roll housing and are connected to the supports of the bearings of the roll. The bearings of the rolls are axially slidable within the roll supports and a sliding guide is arranged on the roll support for a sliding carriage, which supports a coupling device for a roll neck. The hydraulic piston-cylinder units are articulated to the sliding carriage. The coupling device includes drive members which are slidable in radial guides and can be placed in an annular groove of the roll neck. The coupling device is supported by the neck bushing of the deep-groove-type radial roller bearing which is immovably arranged in the sliding carriage. The drive members include skirt-type pistons which are guided in radially extending guide bores within the neck bushing. The pistons are biased by means of a spring in the direction toward the roll neck and are biased toward the opposite direction by means of a pressure medium.

U.S. Pat. No. 4,157,626 discloses a document protecting device for holding a flexible document comprising a first and a second member each having a transparent substantially planar central region interposed between end regions. Each of the end regions includes a protrusion extending outwardly relative to the planar central region. The first member is mounted relative to the second member with the protrusions defining end containers for receiving rolled portions of the flexible document with the planar central regions protecting an intermediate portion of the flexible document. The first and second members may be slidably mounted relative to one another for exposing a portion of the flexible document for making notations thereon. The first and second members may be substantially identical to one another with each of the members having a groove on one end thereof and a slide on the other end thereof. The first and second members are slidably secured to one another with the slides in the first and second members cooperating with the groove in the other of the first and second members.

Neither of these patents is directed to the winding of a document scroll on or off a roller, so as to allow a reader to advance forwards or backwards through the scroll.

SUMMARY OF THE INVENTION

This object is realized in accordance with a first aspect of the invention by an apparatus for facilitating scrolling of a scrollable document on and off at least one roller fixed to a respective edge of the document, the apparatus comprising:

a pair of tracks each for supporting a respective end of each roller, and for each roller; a corresponding pair of sliders at least one pair of which is adapted for sliding movement along a respective one of the tracks and each being adapted for rotatably supporting a corresponding end of the roller.

According to a second aspect of the invention there is provided a method for facilitating scrolling of a scrollable document having at least one edge fixed to a corresponding roller, the method comprising the steps of:

(a) providing a pair of tracks each for supporting a respective end of the or each roller, (b) providing for each roller a pair of sliders at least one pair of which is adapted for sliding movement along a respective one of the tracks and each being adapted for rotatably supporting a corresponding opposing end of the respective roller, (c) disposing the sliders in respective ones of the tracks, and (d) rotatably mounting the opposing ends of the respective roller in said sliders.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 3 is a pictorial representation of an apparatus according to a second embodiment of the invention;

FIG. 4 shows pictorially a detail of a modified slider used in the apparatus illustrated in FIG. 3;

FIG. 5 shows pictorially an alternative track for use with the apparatus of FIG. 1 or FIG. 3;

FIG. 6 shows pictorially a rolling track for use with the track illustrated in FIG. 5.

DETAILED DESCRIPTION OF THE INVENTION

Figure 1A:
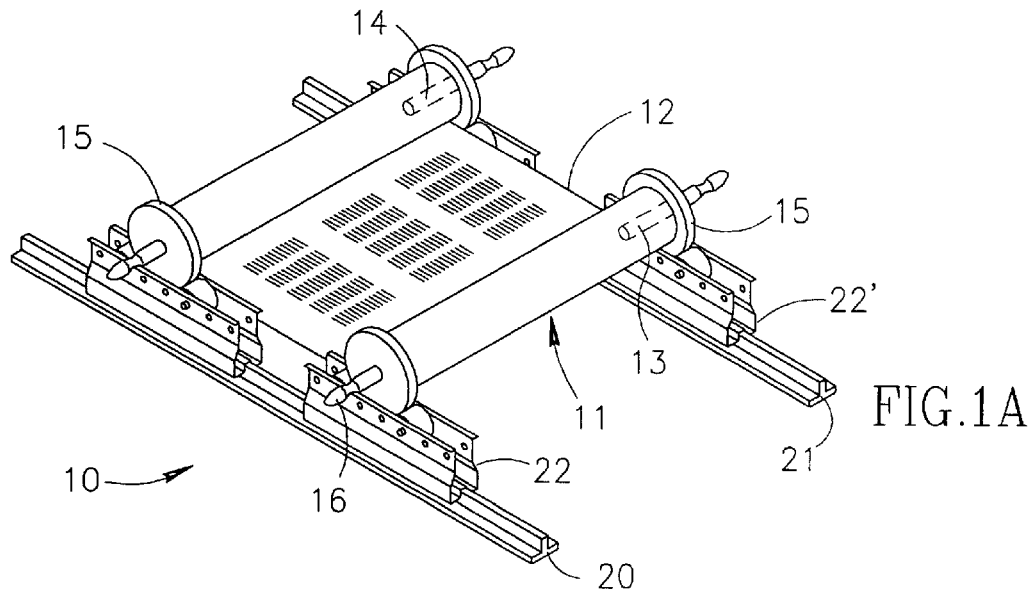
FIGS. 1a to 1c are pictorial representations of an apparatus according to a first embodiment of the invention for facilitating scrolling of a scrollable document having opposite edges fixed to respective roller.
Figure 1B:
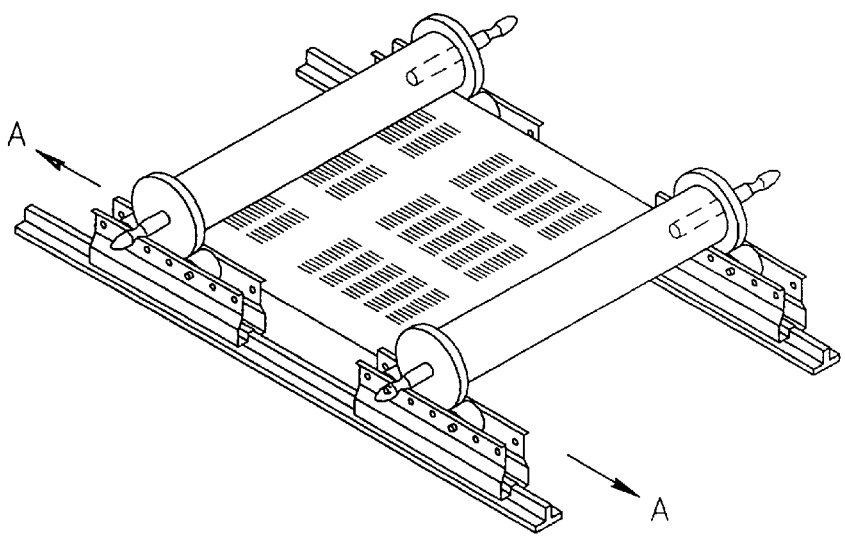
Figure 1C:
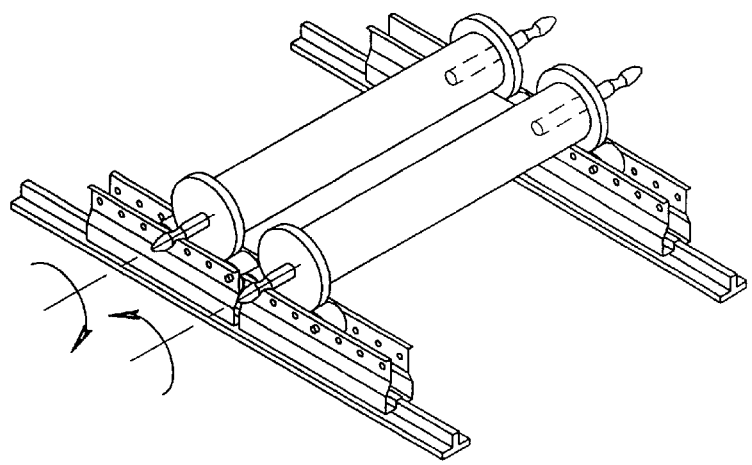

FIGS. 1a to 1c are pictorial representations of an apparatus depicted generally as 10 according to a first embodiment of the invention for facilitating scrolling of a Torah scroll 11 (constituting a scrollable document) comprising a parchment 12 fixed at opposite right- and left-hand edges to respective rollers 13 and 14 shown partially in dotted outline. At opposite ends of each roller are respective circular end plates 15 of sufficient diameter so that when the scroll 12 is completely rolled on to one of the rollers 13 or 14, the end plates 15 on that roller fully contain the rolled up parchment thus preventing it from escaping or slipping from the roller. Extending from lower and upper ends of each roller are respective handles 16 which allow the Torah scroll 11 to be lifted or carried and also for the parchment 12 to be rolled from one roller to another.

The apparatus 10 comprises a pair of tracks 20 and 21 for supporting a respective lower or upper end of the roller. The apparatus 10 further includes, for each roller, a pair of sliders 22 and 22' adapted for sliding movement along a respective one of the tracks 20 and 21 and each being adapted for rotatably supporting a corresponding end of the roller.

FIG. 1b shows the scroll 11 being unscrolled either in order to view a desired portion or, during reading, to wind the scroll from one roller to the other. Such operation is achieved by holding the two lower handles 16 with opposite hands and winding the rollers 13 and 14 in opposite directions (i.e. clockwise and anti-clockwise, respectively) so as to open the scroll whilst allowing the respective pairs of sliders to move along their tracks in opposite directions as shown by the arrows A—A. Very little effort is required to do this because the circular end plates 15 are rotatably supported within each slider, and thus rotation of the rollers via the handles 16 is greatly facilitated. At the same time, mutual transverse displacement of the two rollers is facilitated by virtue of the fact that each pair of the sliders 22 and 22' moves effortlessly along the respective tracks.

FIG. 1c shows the opposite situation when the scroll is closed: this being achieved by rotating the right roller 13 in a counterclockwise direction and the left roller 14 in a clockwise direction. Here, too, the rollers 13 and 14 are easily rotated owing to the fact that the circular end plates 15 are rotatably supported within the respective sliders. At the same time, mutual transverse displacement of the respective pairs of sliders towards one another is facilitated by the effortless movement of the sliders along the respective tracks.

Figure 2:
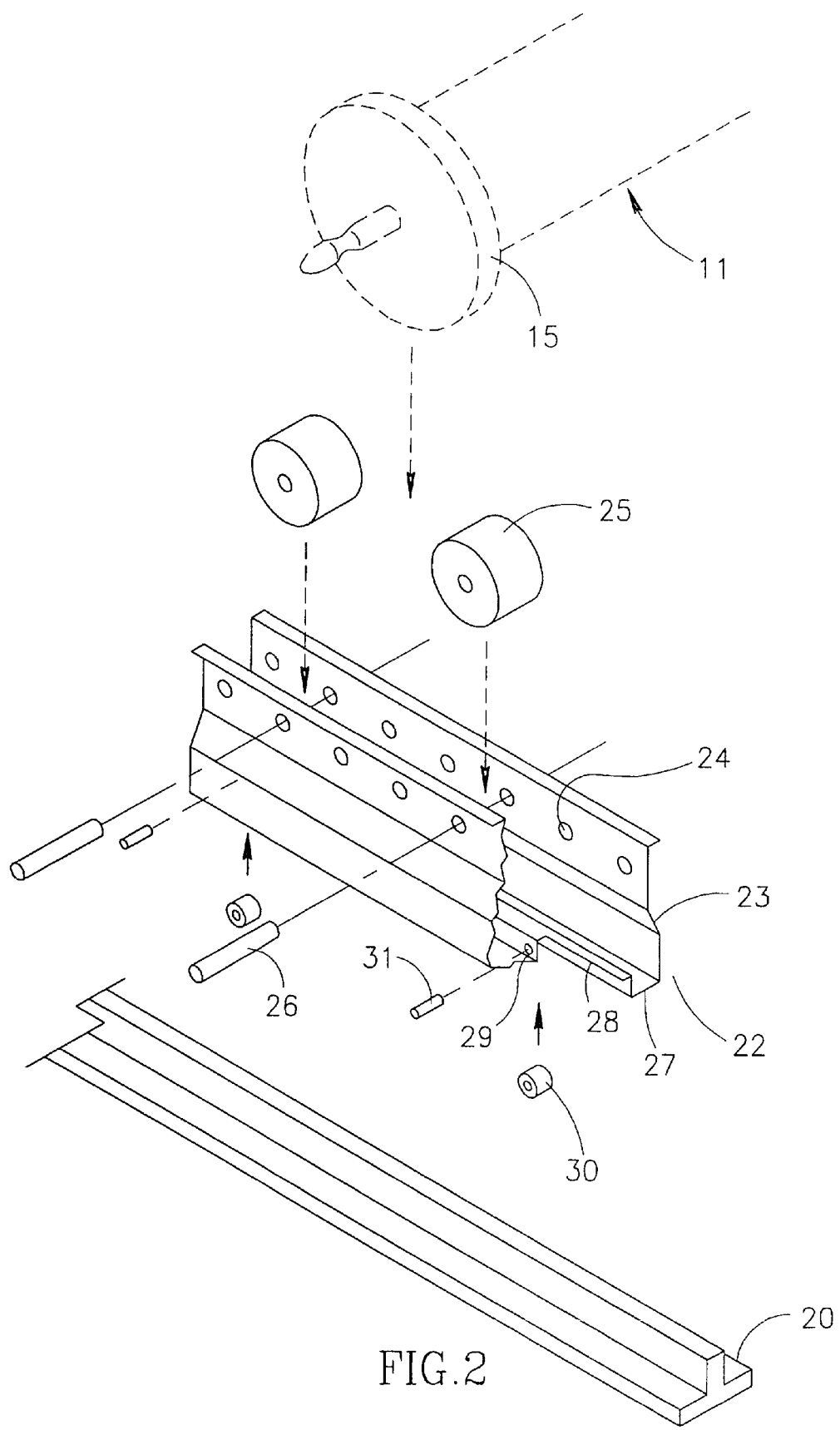
FIG. 2 is an exploded view showing a detail of the apparatus depicted in FIGS. 1a to 1c.

FIG. 2 shows an exploded view of the slider 22 or 22' including a body portion 23 having a substantially U-shaped cross-section. Through opposing sides of the body portion 23 towards respective upper edges thereof is a row of apertures 24 allowing a pair of rollers 25 (constituting a pair of mutually displaced rolling supports) to be supported therein by respective pins 26. The distance between the rollers 25 may thus be adjusted in accordance with the pitch of the apertures 24 in order to suit the diameter of the end plates 15 of the Torah scroll. A lower surface 27 of the slider 22 is provided with a recess 28 on opposing side walls of which apertures 29 are formed, thus allowing small rollers or wheels 30 (each constituting a rolling support) to be rotatably supported within the recess 28 by means of respective pins 31. The rollers 30 allow the slider 22 to roll along the respective tracks 20 and 21 thereby facilitating opening and closing the scroll 11.

It will be appreciated that modifications may be effected to both the slider 22, 22' and the tracks 20 and 21 without departing from the scope of the invention as claimed. By way of example, FIG. 3 shows an apparatus 35 including sliders 36 shown in enlarged detail in FIG. 4. The sliders 36 are typically formed of a plastics molding and are provided in a lower surface thereof with a longitudinal recess 37 for slidably engaging an upwardly protruding rail 38 of a corresponding track 39. The sliders 36 are also provided with recesses 40 of circular section having an axis that is transverse to that of the longitudinal recesses 37 and is dimensioned for accommodating therein the end plates 15 of the scroll 11. Turning the handles 16 of the scroll 11 causes the end plates 15 to rotate within the respective circular recesses 40 of the sliders 36, whilst allowing the sliders 36 to slide along their respective tracks 39. More frictionless rotation of the end plates 15 within the circular recesses 40 of the slider 36 may be assured by providing roller bearings 41 along the arcuate inner surface of the recess 40. Likewise, even more functionless sliding of the slider 36 along the tracks 39 may be assured by providing rolling supports within the recesses 37, as described above with reference to FIG. 2 of the drawings.

FIG. 5 shows an alternative form of track 45 which may also be formed of a plastics molding and, instead of being provided with an upwardly protruding rail as shown in FIGS. 2 and 3, is provided with a recess 46 being dimensioned for accommodating therein the slider 22, 22' shown in FIG. 1a or 36 shown in FIGS. 3 and 4. In use, whichever type of slider is used, the slider may be provided on its lower surface with rolling supports designated 30 in FIG. 2, or these may be omitted in the event that the mutually contacting surfaces of the track 45 and the slider are sufficiently smooth to allow unimpeded sliding contact.

FIG. 6 shows pictorially a rolling track 47 typically formed of a plastic strip 48 and having regularly spaced windows 49 formed therein, each for rotatably accommodating a rolling support 50 of sufficient dimension to protrude slightly through opposing upper and lower surfaces of the plastic strip 48. Such a rolling track 47 may be disposed within the recess 46 of the track 45, thereby obviating any need to provide corresponding rolling supports within the sliders. By the same token, of course, the rolling supports may, if desired, be integral with the track.

Figure 7:
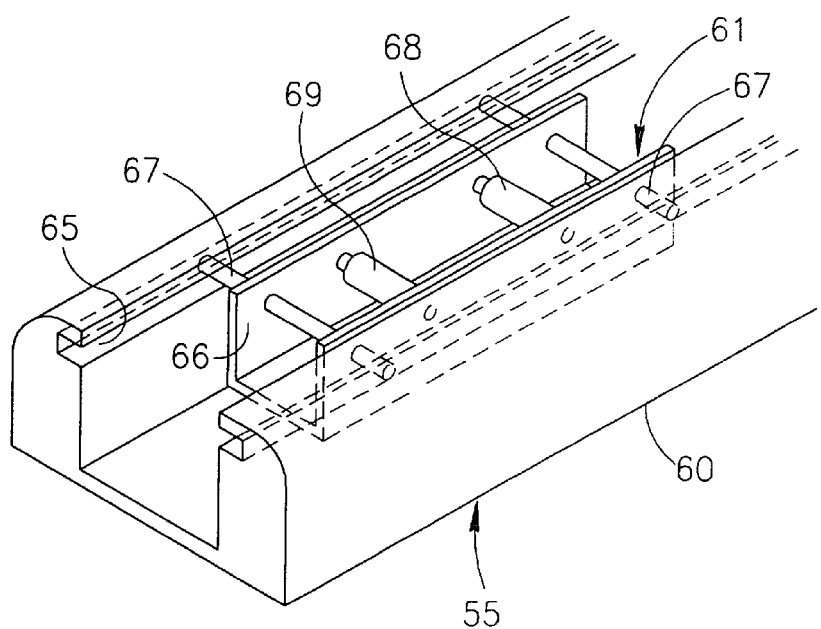
FIGS. 7 and 8 show perspective and cross-sectional views, respectively, of an apparatus according to a third embodiment of the invention.
Figure 8:
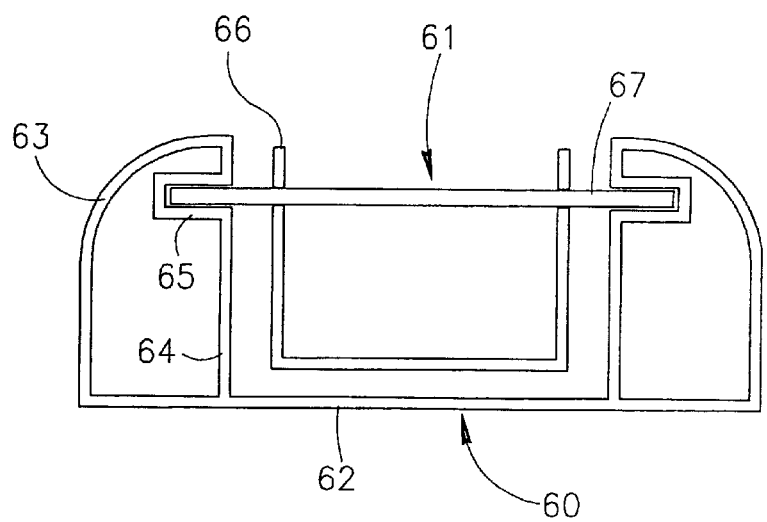

FIGS. 7 and 8 show in perspective and cross-section, respectively, apparatus designated generally as 55 according to a third embodiment of the invention, including a track 60 and a slider 61 integral therewith. The track 60 comprises a base section 62 having rounded side walls 63 abutting opposing vertical inner walls 64, all formed as a composite injection plastics molding. Likewise, towards an upper end of each of the opposing vertical inner walls 64 is molded a longitudinal slot 65.

The slider 61 comprises a substantially U-shaped cradle having opposing walls 66, through which, at opposite ends thereof towards an upper edge of the slider are formed respective rods 67 dimensioned for sliding within the longitudinal slots 65 of the track 60. A pair of mutually displaced rollers 68 and 69 are rotatably supported within the walls 66 of the slider 61 for supporting thereon the rollers 13 and 14 of the document scroll 11, as explained above with reference to FIGS. 1 and 2 of the drawings.

The slider 61 is also formed of an injection plastics molding such that the U-shaped cradle and the supporting rods 67 are formed of an integral molding. The U-shaped cradle and the supporting rods 67 are dimensioned so that when the supporting rods 67 are supported by the longitudinal slots 65 of the track 60, the slider 61 is suspended within the track 60, there being no contact between the slider 61 and the base 62 of the track 60. Owing to the fact that the two principal components of the apparatus 55 may be formed by injection molding, the apparatus 55 is inexpensive to produce and easily amenable to mass production.

Although various examples have been described, it will also be understood that these are not intended to be exhaustive and features of one design may be combined with those of another and the appended claims are intended to cover such combinations. For example, the tracks 20, 21 and 39 shown respectively in FIGS. 1 and 2 may be constituted by the recessed track shown in FIG. 5. It will also be noted that not both pairs of sliders need actually slide along the tracks in order to allow mutual functionless displacement of the rollers 13 and 14 towards and away from one another. Thus, the apparatus according to the invention also contemplates that one pair of sliders be fixed relative to the tracks, whilst still allowing the other pair of sliders to slide along the tracks.

Although in the preferred embodiments, the circular end plates of the rollers are rotatably supported by the sliders, the invention also contemplates that the handles be rotatably supported by the sliders, particular in the case where the scroll is not too heavy.

It will also be appreciated that whilst in the slider shown in FIG. 2, both of the rolling supports are adjustable, the desired effect may also be achieved even when only one of the roller supports is moveable and the other is fixed within the slider.

Likewise, whilst the invention has been described with particular example to a scroll having opposing edges fixed to respective rollers, thus allowing the scroll to be rolled off one roller and on to the other; the invention also contemplates the use of an apparatus for use with scrolls supported by a single roller at one edge only. In such an embodiment, whilst the ability of the single roller to slide is clearly of secondary importance, the apparatus according to the invention facilitates winding of the scroll on and off the roller.

It will also be understood that the apparatus may be formed from different materials, these not being a feature of the invention. Different materials and methods of manufacture may be employed all without departing from the scope of the invention as claimed. Other modifications will be readily apparent for those skilled in the art.

What is claimed is:

1. An apparatus for facilitating scrolling of a scrollable document on and off at least one roller fixed to a respective edge of the document, the apparatus comprising:
   a pair of tracks each for supporting a respective end of each roller, and
   for each roller, a corresponding pair of sliders at least one pair of which is adapted for sliding movement along a respective one of the tracks and each being provided with a pair of mutually displaced rolling supports for rotatably supporting therebetween a corresponding end of the roller.

2. The apparatus according to claim 1, wherein a location of at least one of said pair of mutually displaced rolling supports within the slider is adjustable.

3. The apparatus according to claim 1, wherein each slider is provided with a substantially U-shaped recess for rotatably supporting therein a corresponding end of the roller.

4. The apparatus according to claim 3, wherein an end of each slider is suspended within a corresponding one of said tracks.

5. The apparatus according to claim 4, wherein the tracks and the sliders are formed of an integral plastics molding.

6. The apparatus according to claim 1, wherein each slider is adapted to rotatably support a respective circular end plate provided at opposing ends of the roller.

7. The apparatus according to claim 1, wherein:
   the roller includes a respective handle at each of said opposing ends thereof, and
   each slider is adapted to rotatably support a respective one of the handles.

8. The apparatus according to claim 1, wherein each of the sliders is supported along the track on a rolling support.

9. The apparatus according to claim 8, wherein the rolling support is at least one wheel rotatably fixed underneath the slider for enabling the slider to roll along the track.

10. The apparatus according to claim 8, wherein each track contains displaced rolling supports for supporting a respective one of the sliders thereon.

11. The apparatus according to claim 1 for use with a scrollable document having opposite edges each fixed to a respective roller; each rotatably supported within a corresponding pair of sliders at respective opposing ends thereof.

12. The apparatus according to claim 11, wherein each of said sliders is adapted for sliding movement along a corresponding one of the tracks.

13. The apparatus according to claim 11, wherein:
   a first one of said rollers is rotatably supported at respective opposing ends thereof within a corresponding pair of sliders each of which is adapted for sliding movement along a corresponding one of the tracks, and
   a second one of said rollers is rotatably supported at respective opposing ends thereof along a corresponding pair of sliders each of which is anchored to a corresponding one of the tracks.

14. A slider for use with the apparatus according to claim 1, said slider being adapted for sliding movement along one of the tracks and being provided with a pair of mutually displaced rolling supports for rotatably supporting therebetween a corresponding end of the roller.

15. The apparatus according to claim 14, wherein a location of at least one of said pair of mutually displaced rolling supports within the slider is adjustable.

16. The slider according to claim 14, including a body portion having a substantially U-shaped recess for rotatably supporting therein an end of the roller.

17. The slider according to claim 14 being adapted to rotatably support a circular end plate provided at an end of the roller.

18. The slider according to claim 14 being adapted to rotatably support a handle provided at an end of the roller.

19. The slider according to claim 14, including a rolling support for allowing the slider to roll along one of the tracks.

20. A slider for use with the apparatus according to claim 1, said slider being adapted for sliding movement along one of the tracks and being adapted to rotatably support a respective circular end plate provided at opposing ends of the roller.

21. The slider according to claim 20, including a pair of mutually displaced rolling supports for rotatably supporting therebetween an end of the roller.

22. A method for facilitating scrolling of a scrollable document having at least one edge fixed to a corresponding roller, the method comprising the steps of:

(a) providing a pair of tracks each for supporting a respective end of the or each roller, (b) providing for each roller a pair of sliders at least one pair of which is adapted for sliding movement along a respective one of the tracks and each being adapted for rotatably supporting a corresponding opposing end of the respective roller, (c) disposing the sliders in respective ones of the tracks, and (d) rotatably mounting the opposing ends of the respective roller in said sliders.

23. The method according to claim 22, wherein each roller is provided with a respective circular end plate at the opposing ends thereof, and step (d) includes rotatably mounting each of the circular ends plates in a respective one of the sliders.

24. The method according to claim 22, wherein each roller is provided with a respective handle at the opposing ends thereof, and step (d) includes rotatably mounting each of the handles in a respective one of the sliders.

25. An apparatus for facilitating scrolling of a scrollable document on and off at least one roller fixed to a respective edge of the document, the apparatus comprising:

a pair of tracks each for supporting a respective end of each roller, and for each roller, a corresponding pair of sliders at least one pair of which is adapted for sliding movement along a respective one of the tracks and each being adapted to rotatably support a respective circular end plate provided at opposing ends of the roller.

26. The apparatus according to claim 25, wherein each slider is provided with a pair of mutually displaced rolling supports for rotatably supporting therebetween a corresponding end of the roller.

* * * * *